April 11, 1939.   W. ALBERT   2,153,606
CAMERA CARRYING CASE
Filed Oct. 27, 1937
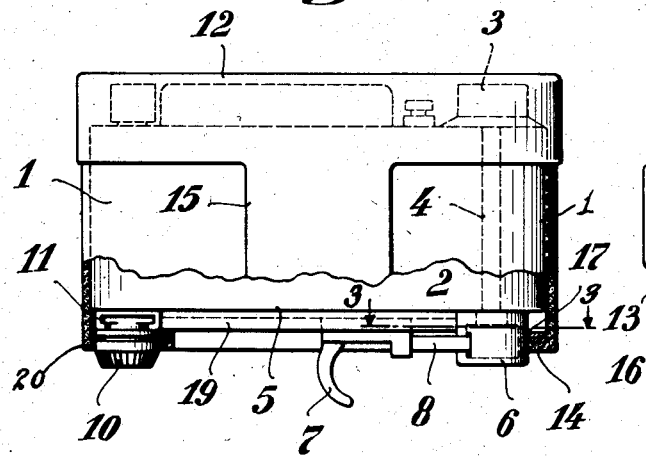
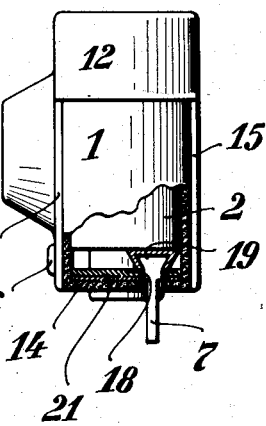
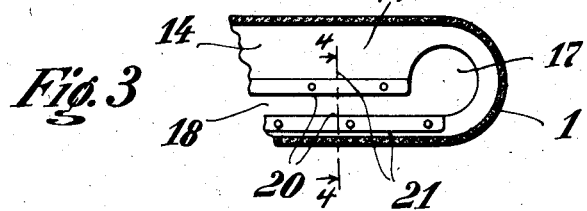
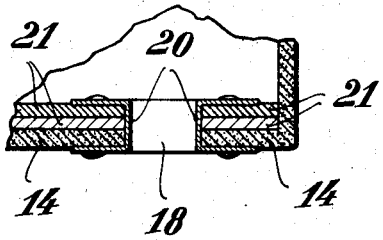
INVENTOR
*Wilhelm Albert.*
BY
*Jean E. C. Konigsberg*
ATTORNEY Patented Apr. 11, 1939

2,153,606

UNITED STATES PATENT OFFICE 2,153,606

CAMERA CARRYING CASE

Wilhelm Albert, Wetzlar, Germany, assignor to Ernst Leitz, G. m. b. H., Wetzlar, Germany Application October 27, 1937, Serial No. 171,317
In Germany December 19, 1936

1 Claim. (Cl. 95—31)

This invention relates to improvements in carrying cases for a miniature hand camera of the type which ordinarily has a removable flat bottom. Such a camera may however be provided with another bottom which supports for instance a quick winding up attachment or an exposure meter. Such attachments, for instance the quick winding up attachment, has a handle which projects from the bottom, hence the ordinary camera carrying case cannot be used because in the first place it is not deep enough. Secondly its bottom is solid and thus the handle for the quick winding up attachment is not accessible from without the casing.

It is desirable to provide a camera carrying case which includes such features of construction as will make it usable for carrying and operating cameras provided with an attachment at the bottom such as a quick winding up attachment for instance which necessarily has a projecting operating handle which must be accessible from without the casing. The object of this invention is to provide such an improved camera carrying case. In the drawing illustrating the invention Fig. 1 is a side view of the case containing the camera with parts broken away and parts in section.

Fig. 2 is an end view looking from the left in Fig. 1 with parts removed and parts in section.

Fig. 3 is a view of a portion of the case bottom looking down upon it and taken on the line 5—5 of Fig. 1.

Fig. 4 is a sectional detail view taken on the line 4—4 of Fig. 3.

In Fig. 1 a portion of the leather case 1 is broken away to show the camera 2 which is otherwise identified by the usual winding up knob 3 for operating the shaft 4 for rewinding the shutter and advancing the film. In this instance the camera is provided with a special bottom 5 which supports a quick winding up device 6. The latter is coupled to the shaft 4 by suitable means not shown. The winding up of the shaft 4 is then done by pulling on a handle 7 attached to a ribbon 8 connected to the winding up device 6. A spring not shown keeps the handle 7 in retracted position.

The case 1 has its top 12 and its front 13 hinged to the case bottom 14 by a hinge strap 15. Closure is effected by a snap button 16. In the bottom 14 there is an opening 17 through which the coupling device 6 projects. The opening communicates with a slot 18 for the passage and operation of the handle 7 and ribbon 8. The handle is otherwise guided in a channel member 19 secured to the camera bottom 5.

The camera is securely locked to the casing by means of a locking knob 10 which upon rotation engages suitable flanges 11 on the camera bottom 5. The slit 18 is protected by metal strips 20 and the bottom 14 is reinforced as at 21.

In use, the case is opened and the camera is held within the case while taking pictures. At the same time the handle is accessible and may be operated without removing the camera from the case. The special quick winding up attachment enables the photographer to rewind the camera quickly between exposures without interruptions which otherwise are necessary for operating the rewinding knob.

I claim:

A photographic camera carrying case comprising a case body including an openable cover and a bottom, said case being adapted to contain and enclose a photographic camera having a winding up mechanism projecting from the camera bottom and having attaching members also projecting from the camera bottom, means in the bottom of the said case operable from without the case for engaging said attaching members to secure the camera within the case, said case bottom having a longitudinal slot therein through which an operating member of the said winding up mechanism projects for operation thereof from without the case.

WILHELM ALBERT.